US 11,185,097 B2

(12) United States Patent
Mboumtcho et al.

(10) Patent No.: US 11,185,097 B2
(45) Date of Patent: Nov. 30, 2021

(54) METHOD AND APPARATUS FOR PROVIDING SUSHI

(71) Applicant: 9857044 CANADA INC., Montréal (CA)

(72) Inventors: Serge Mboumtcho, Laval (CA); Lucie Benveniste, Pointe-Claire (CA); Louis Richard, St-Hubert (CA); Solange Adechian, St-Constant (CA); Laurent Cabal, Montreal (CA)

(*) Notice: Subject to any disclaimer, the term of this patent is extended or adjusted under 35 U.S.C. 154(b) by 0 days.

(21) Appl. No.: 16/614,087

(22) PCT Filed: May 30, 2017

(86) PCT No.: PCT/CA2017/050652
§ 371 (c)(1),
(2) Date: Nov. 15, 2019

(87) PCT Pub. No.: WO2018/218329
PCT Pub. Date: Dec. 6, 2018

(65) Prior Publication Data
US 2020/0367536 A1 Nov. 26, 2020

(51) Int. Cl.
*A23L 3/36* (2006.01)
*A23L 5/00* (2016.01)
(Continued)

(52) U.S. Cl.
CPC .............. *A23L 3/363* (2013.01); *A23B 4/066* (2013.01); *A23B 4/16* (2013.01); *A23L 3/3418* (2013.01);
(Continued)

(58) Field of Classification Search
CPC .......... A23L 3/363; A23L 5/00; A23L 7/1963; A23L 17/00; A23L 7/1965; A23L 3/3418; A23B 4/066; A23B 4/16
See application file for complete search history.

(56) References Cited

U.S. PATENT DOCUMENTS 9,497,982 B1 * 11/2016 Sinz ..................... A23P 20/20
2007/0014900 A1   1/2007 Ishino et al.
(Continued)

FOREIGN PATENT DOCUMENTS

CA      2622146 A1    9/1999
EP      2614729 A1 *  7/2013 ............... A23B 7/04
(Continued)

OTHER PUBLICATIONS

"How to Keep Supermarket Sushi's Rice Soft" Jan. 13, 2017 http://kansaichick.com/japanese-kanji-blog/japanese-life-hacks/how-to-keep-supermarket-sushis-rice-soft/ (Year: 2017).*
(Continued)

Primary Examiner — Katherine D Leblanc
(74) Attorney, Agent, or Firm — Anglehart et al.

(57) ABSTRACT

A method of providing sushi for consumption. The method includes preparing the sushi; placing the sushi in a humidified refrigerated storage unit at an ambient humidity level over 65% and under 99% and at a temperature between about 0° C. and about 7° C.; preserving for a period under fifteen hours the sushi in the humidified refrigerated storage unit to reduce loss of moisture of the sushi rice of the sushi during the preservation period; and removing the sushi from the humidified refrigerated storage unit prior to being served.

12 Claims, 5 Drawing Sheets

(51) Int. Cl.
*A23L 7/196* (2016.01)
*A23B 4/06* (2006.01)
*A23B 4/16* (2006.01)
*A23L 3/3418* (2006.01)
*A23L 17/00* (2016.01)

(52) U.S. Cl.
CPC ............... *A23L 5/00* (2016.08); *A23L 7/1963* (2016.08); *A23L 7/1965* (2016.08); *A23L 17/00* (2016.08); *A23V 2002/00* (2013.01)

(56) References Cited

U.S. PATENT DOCUMENTS

| | | | |
|---|---|---|---|
| 2008/0305222 | A1 | 12/2008 | Takenaka |
| 2011/0031236 | A1* | 2/2011 | Ben-Shmuel ........ H05B 6/6447 219/620 |
| 2012/0177787 | A1* | 7/2012 | Mizuno .................... A23B 4/06 426/92 |

FOREIGN PATENT DOCUMENTS

| | | |
|---|---|---|
| JP | S63233279 A | 9/1988 |
| JP | H02251079 A | 10/1990 |
| JP | H07246056 A | 9/1995 |
| JP | H07-250633 A | 10/1995 |
| JP | 3131818 U | 5/2007 |

OTHER PUBLICATIONS

PCT/CA2017/050652 International Search Report dated Feb. 8, 2018.
PCT/CA2017/050652 Search Strategy dated Feb. 8, 2018.
PCT/CA2017/050652 Written Opinion of the International Searching Authority dated Feb. 8, 2018.
Japanese application No. 2019-566600 Office Action dated Jan. 5, 2020 with the English translation.
European application No. 17912237.9 Supplementary European search report and search opinion dated Nov. 16, 2020.
Canadian application No. 2999343 Office Action dated May 7, 2018.
Everest ESC59R 59-Inch Right Compressoer Curved Glass Refrigerated Sushi Case, 2 Cubic Feet, NSF., Dec. 17, 2013 (online), pp. 1-3, retrived on Dec. 17, 2020, retrieved from the internet: <https://www.amazon.com/Everest-ESC59R-Contained-Countertop-Refrigerated/dp/B00HDF2ENG>.
Re-submission of the translation from the European patent office for foreign patent document JPS63233279 previously submitted on Jan. 11, 2021 with translation.

* cited by examiner

METHOD AND APPARATUS FOR PROVIDING SUSHI

TECHNICAL FIELD

The present application relates to methods and apparatuses for preserving the organoleptic properties of sushi, including the moistness and water content of the sushi rice. The present application also relates to methods and apparatuses for rapidly increasing the temperature of the sushi for consumption following its refrigeration.

BACKGROUND

The preparation and serving of sushi involves a delicate balance of flavours and texture. In addition to a variety of fresh ingredients ranging from vegetables to seafood, sushi is composed of a significant portion of rice. As a result, the properties of the rice, including its texture and flavour, play a significant role in the overall gastronomic experience. In fact, different forms of rice may be used and favored by certain sushi experts in order to optimize its flavour.

Sushi is best prepared using freshly cooked sushi rice that is cooled and then combined with fresh ingredients by a sushi chef with consumption of the sushi within one hour from the time of preparation. Sushi is best consumed at room temperature (18° C.-20° C.) or at least 10° C., however, it can be refrigerated prior to consumption. Sushi counters are popular restaurant outlets, especially for lunchtime customers, in which boxes of sushi are prepared and stored in refrigerators and then sold to customers for consumption in the outlet or as take-out. In this latter business model, sushi preparation can be prepared hours in advance of the time of delivery to the customer so that a large quantity of sushi can be accumulated in refrigerated storage for sale at the mealtime using a smaller size of sushi preparation personnel. It is also possible to prepare sushi at a central location and to transport prepared sushi to sushi counter restaurant outlets. This allows for the cost of preparation and the footprint of the outlets to be more efficient.

Sushi rice may become dry and even crusty when kept in certain refrigerated environments for several hours such as in conventional refrigeration units, where the humidity within such refrigerators is around 60%-65% humidity. There is therefore a loss in quality of sushi organoleptic properties as a result of cold storage over a number of hours with respect to the quality after an hour of storage.

Moreover, sushi is often refrigerated for a significant time at temperatures below 4° C. However, it is preferred that sushi be served and consumed at least at 10° C. and best around room temperature (for instance, around 18° C.-20° C.). Therefore, a problem involves successfully increasing the temperature of the refrigerated sushi slightly to bring the sushi to an optimal temperature prior to consumption. Such a heating process may be performed in such a way as to not cook or spoil the delicate ingredients used in the sushi, such as the raw fish, seafood or vegetables, while also allowing the heat to distribute uniformly throughout each sushi. Furthermore, the rise in temperature is also to be performed rather rapidly so as not to delay the customer who is eager to consume the sushi.

SUMMARY

Applicant has discovered that rice has unique interactive properties with water allowing for rice to maintain its moistness if preserved in a sufficiently humid environment.

Nebulized refrigeration is known in the art for cold storage of fruits and vegetables. Water mist is produced and circulated within the refrigerated enclosure. Applicant has found that nebulized refrigeration systems operate for fruits and vegetables normally at near 100% humidity and that such systems are undesirable for use in storing sushi because the rice becomes soggy and unappetizing in such environments.

Therefore, Applicant has discovered that storing prepared sushi in a humidified refrigerated environment allows for the sushi to maintain its freshness, namely by allowing the sushi rice to keep its moistness, not losing it to the ambient air. A humidified refrigerated environment is one where the ambient humidity level is superior to that of conventional refrigerators, that is, an ambient humidity level that is over 65% (conventional non-humidified refrigeration units have typically an ambient humidity level of around 60%-65%). This humidified environment results in the sushi rice retaining more moisture than conventional non-humidified refrigerators.

Moreover, Applicant has discovered that maintaining the ambient humidity level below 99% reduces the undesired result of having the sushi rice change consistency when stored over prolonged periods (e.g. over six hours) due to absorbing too much water from the ambient air (e.g. become mushy or soggy).

Preferably, the air of the refrigerated environment is to be maintained above 70% humidity, but below 99% humidity. In some examples, the ambient humidity level is preferably maintained above about 80%, and below about 95%.

Moreover, Applicant has discovered that heating refrigerated sushi using a combination of a hot plate on which the sushi is placed, and a hot lamp placed above the sushi provides adequate heat from above and below to heat the sushi to 9° C. and more. The dual heat source, respectively heating from above and below, provides sufficient heat transfer to warm up the sushi to near room temperature, the sushi heated uniformly, and this heating being done in a short period. Furthermore, as the sushi is placed on the hot plate for a short period, the delicate ingredients used in the sushi are substantially unaffected, and there is little to no risk of cooking these ingredients, such as cooking the uncooked fish or seafood.

In some examples, the refrigerated sushi should not be heated for a period longer than 90 seconds, where the sushi is brought to an internal temperature of around 10° C., optimal for consumption.

A first broad aspect is a method of providing sushi for consumption. The method involves preparing the sushi, the sushi comprising a quantity of freshly cooked rice combined with at least one other ingredient. The method also includes placing the sushi in a humidified refrigerated storage unit at an ambient humidity level over 65% and below 99% and at a temperature between about 0° C. and under about 7° C. (wherein regulations for food preservation may set the standard refrigeration temperature to a range between about 0° C. to about 4° C., the temperature of a conventional refrigerator may increase to up to about 7° C. during its defrost cycle). The method involves preserving for a period of at least two hours and under fifteen hours the sushi in the humidified refrigerated storage unit to reduce loss of moisture of the sushi rice of the sushi during the preservation period in comparison with non-humidified refrigerated storage. The method encompasses removing the sushi from the humidified refrigerated storage unit prior to being served.

In some embodiments, the method also may involve, after the removal from the humidified refrigerated storage unit, and prior to being served, preheating the sushi until the rice of the sushi reaches a temperature of around at least 9° C. The preheating may be maintained until the rice of the sushi reaches a temperature of around 10° C.

In some embodiments, the ambient humidity level may be above about 70% and below about 95%. The ambient humidity level may be between about 82% and 90%. The ambient humidity level may be about 85%.

In some embodiments, the rice sample may be preserved in the humidified refrigerated storage unit for a period of at least two hours. The rice sample may be preserved in the humidified refrigerated storage unit for a period of at least four hours. The rice sample may be preserved in the humidified refrigerated storage unit for a period of at least eight hours.

In some embodiments, the method may also include measuring an initial weight of the sushi corresponding to a weight of the sushi when the sushi is placed in the humidified refrigerated storage unit. The method may involve measuring a periodic weight of the sushi taken at a designated period following the time the sushi has been placed in the humidified refrigerated storage unit. The method may include comparing the initial weight to the periodic weight to monitor the adequacy of the ambient humidity level.

In some embodiments, prior to the placing of the sushi in the humidified refrigerated storage unit, the method may include placing a rice sample with a known initial weight in the humidified refrigerated storage unit. The method may include measuring a subsequent weight of the rice sample after a designated time interval from the time of the placing of the rice sample in the humidified refrigerated storage unit to detect any difference of weight between the initial weight of the rice sample and the subsequent weight of the rice sample, wherein the difference of weight is attributable to a change in the water content of the rice sample. The method may involve adjusting the ambient humidity level as a function of the detected weight difference of the rice sample. In some embodiments, the rice sample placed in the humidified refrigerated storage unit may be of a same type as the rice used in sample sushi.

A second broad aspect is a method of providing sushi including the preparing of the sushi, the sushi comprising a quantity of freshly cooked rice combined with at least one other ingredient. The method also includes storing the sushi in a refrigerated storage unit at a temperature between about 0° C. to about 7° C. prior to consumption. The method further involves removing the sushi from the refrigerated storage unit. The method includes heating the sushi using a heating device comprising a first heat source for providing direct heat to the sushi, a second heat source for providing indirect heat to the sushi, and a surface in proximity with the first heat source and the second heat source to receive the sushi, wherein the second heat source does not come into contact with the sushi. The method also includes removing the sushi from the heating device once enough heat has been transferred to the sushi to increase the temperature of the sushi rice of the sushi to at least 9° C. while not cooking the ingredients of the sushi. The heat is transferred directly to the sushi from the first heat source while the sushi is placed on the surface and heat is transferred indirectly to the sushi by the second heat source while the sushi is placed on the surface.

In some embodiments, where the first heat source may be a hot plate, and the heat may be transferred to the sushi from the hot plate while the sushi is left on the surface. In some embodiments, wherein the second heat source may be a heating lamp, the heat may be transferred from the heating lamp to the sushi from the heating lamp while the sushi is left on the surface.

In some embodiments, wherein the surface may be an upper surface of the first heat source, the sushi may be placed on the upper surface of the first heat source.

In some embodiments, the removing may be when the sushi from the heating device once enough heat has been transferred to the sushi to increase the temperature of the sushi rice of the sushi to between about 9° C. and about 20° C. The removing of the sushi from the heating device may be once enough heat has been transferred to the sushi to increase the temperature of the sushi rice of the sushi to about 10° C. (or above 10° C.).

In some embodiments, the temperature (of the heat generated therefrom) of the first heat source may be monitored so that the heating plate does not cook the sushi. In some embodiments, the temperature (or the heat generated therefrom) of the second heat source may be monitored so that the heating lamp does not cook the sushi.

In some embodiments, where the heating device further may have an additional heat source facing a side portion of the sushi when the sushi is placed on the surface, the heat may be transferred to the sushi from the additional heat source while the sushi is placed on the surface.

In some embodiments, the sushi may be removed from the heating device after a time of no more than about 120 seconds of the heating. The sushi may be removed from the heating device after a time of about 90 seconds of the heating.

BRIEF DESCRIPTION OF THE DRAWINGS

The invention will be better understood by way of the following detailed description of embodiments of the invention with reference to the appended drawings, in which.

DETAILED DESCRIPTION

Figure 1:
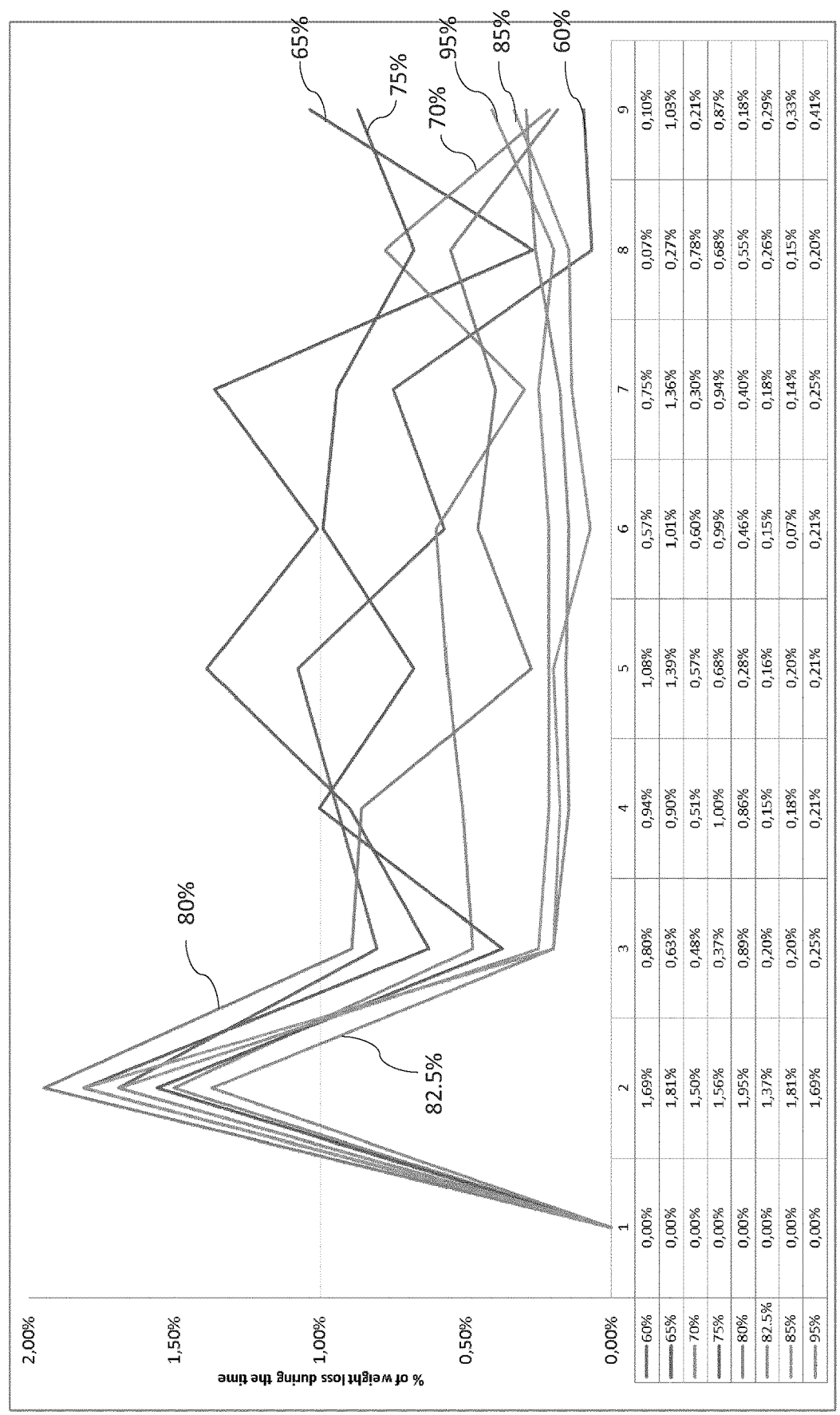
FIG. 1 is a graph illustrating the percentage of weight loss of sushi, attributable to water loss (humidity) of the rice, over time when the sushi is placed in a refrigerator set at different humidity levels.

The present application relates to a method and apparatus for storing sushi and preserving the quality and culinary properties of the sushi, including, for instance, taste, texture, freshness, consistency, and firmness. More specifically, the method relates to storing sushi in a humidified refrigerated environment, where the applicant has discovered that cooked sushi rice used in the sushi possesses certain properties where it may interact with ambient air and retain its moisture over time if preserved in a moist or humid environment.

The present application also relates to a method and apparatus for reheating stored and refrigerated sushi to a sufficient temperature to improve the consumption of the sushi. Therefore, the heating method allows the sushi to reheat from refrigerated temperatures (e.g. between 1° C. to 7° C.) to above around nine degrees Celsius under two minutes by exposing the sushi to at least two heat sources, where a first heat source provides heat to a first surface of the sushi, and a second heat source provides heat to a second surface of the sushi (e.g. top and bottom of the sushi). This dual heat-source allows for rapid heating (less than 130 seconds) of the refrigerated sushi without cooking the contents of the sushi. In a preferred embodiment, the sushi is heated to around 10 degrees Celsius prior to consumption.

Definitions:

"Sushi" means the consumable product resulting from the preparation, traditionally the Japanese preparation, of specially prepared rice, such as vinegared rice, that may be combined with a variety of ingredients, such as seafood, seaweed, vegetables, eggs, fruit or any other suitable food ingredient. The sushi may or may not be wrapped with an outer casing, such as nori. Sushi may also be specially prepared with only rice (flavoured or unflavoured), without any other food added.

In the present application, by "rice type" it is meant namely the specie, variety and/or batch of rice used to prepare the sushi, or any other categorization of rice that may impact upon its properties, such as, for example, its moisture retention, its size, its colour, its flavour.

By "ambient humidity level" it is meant the relative humidity level of the air of the environment in which the sushi is to be or is stored. The ambient humidity level is calculated as the ratio between the partial pressure of water vapor to the equilibrium vapor pressure of water at a given temperature. The environment may be that of the storage compartment of a refrigerator, a storage unit in a vehicle, a counter for presenting sushi, the inside of a storage unit or a storage room. In some cases, the environment may also be an ambient outdoor environment suitable for preserving sushi for a given period. In some examples, the ambient humidity level may be artificially regulated such as by using a controller and a humidity sensor. In other examples, the ambient humidity level may be naturally regulated.

"Refrigerated sushi" means sushi that is stored in a refrigerated environment (i.e. temperatures below room temperature), such as in a refrigerator or in an outdoor environment that is below room temperature.

"Humidified refrigerated storage unit" means a storage unit that is both refrigerated and humidified. The storage unit may be, for example, a refrigerator, a room, or a space suitable for storing sushi or other condiments. By refrigerated it is meant a room that is cooled, or that is cooler than room temperature (e.g. a refrigerator, an outdoor space when the ambient air temperature is below room temperature, typically between 1° C. to 7° C., where regulatory standard set adequate refrigeration to above about 0° C. to about 4° C., but it is understood that when a refrigerator undergoes a defrost cycle the temperature may rise to about 7° C.). By humidified it is meant that the storage unit has an ambient humidity level that is increased above that of conventional, non-humidified storage units (i.e. conventional units being at around 60%-65% humidity). However, the ambient humidity level is less than 99% humidity (at which point, over prolonged storage—e.g. more than 6 hours—the sushi rice may start changing consistency).

By "humidified environment" it is a meant an environment which has an ambient humidity level greater than that of non-humidified refrigeration units (typically between 60%-65%), so a humidified environment has an ambient humidity level over 65%.

Experiment 1: Difference in Taste

Subjects of the Study:

Four sushi expert tasters were selected to monitor the difference in taste between sushi that was stored in a non-humidified (or water non-nebulized) refrigerated environment and sushi that was stored in a humidified (or water nebulized) refrigerated environment. By nebulized or humidified it is meant that the ambient humidity level is increased and is therefore superior to ambient humidity levels found in traditional refrigerators (typically around 60%-65% humidity).

The expert tasters were submitted to a blind tasting and were not aware of the differences between the sushi, namely that one was stored at a higher ambient humidity level than the other. The expert tasters were asked to select which of the sushi they preferred, their preference based upon the organoleptic properties of the sushi, such as taste and texture.

Study Parameters:

The parameters of the humidified refrigeration unit and the non-humidified refrigeration unit are as follows:

TABLE 1 properties of the humidified refrigeration unit versus the properties of the non-humidified refrigeration unit.

| REFRIGERATION UNIT TYPE | HUMIDIFIED REFRIGERATION UNIT | REFRIGERATION UNIT (NON HUMIDIFIED) |
| --- | --- | --- |
| TEMPERATURE INSIDE THE UNIT | between 1° C. and 3° C. | between 1° C. and 3° C. |
| PARTICULARITY OF THE UNIT | Humidified | Non-humidified |
| HUMIDITY INSIDE THE UNIT MEASURED | Fixed at 85% | 60% |
| ROOM TEMPERATURE | 7° C.-10° C. | 7° C.-10° C. |
| DURATION OF THE PRODUCTS EXPOSITION | 2 hours<br>4 hours<br>6 hours<br>8 hours<br>10 hours | 2 hours<br>4 hours<br>6 hours<br>8 hours<br>10 hours |
| TYPE OF RICE TESTED | SUSHI RICE | SUSHI RICE |

TABLE 1-continued properties of the humidified refrigeration unit versus the
properties of the non-humidified refrigeration unit.

| REFRIGERATION UNIT TYPE | HUMIDIFIED REFRIGERATION UNIT | REFRIGERATION UNIT (NON HUMIDIFIED) |
|---|---|---|
| PRODUCTS TESTED | rice paper sushi<br>external nori paper sushi<br>internal nori paper sushi<br>soya paper sushi | rice paper sushi<br>external nori paper sushi<br>internal nori paper sushi<br>soya paper sushi |

The temperatures of the refrigeration units were set at below 4° C. (between 1° C. and 3° C.) to meet recommended governmental food conservation requirements.

The humidity of the humidified refrigeration unit was set to 85%, an ambient humidity level at which there is only a negligible drop in the weight (attributable to water loss) of sushi over time as shown in FIG. 1.

An ambient humidity level of 85% was selected over 99% and above ambient humidity level. It was found that setting the ambient humidity level of 99% or above would result in the sushi rice absorbing too much water, which resulted in the sushi acquiring a mushy and watery-like texture. Therefore, it is preferred to set the ambient humidity level to around a maximum of 95% humidity.

The sushi was also tested with different wrappers (i.e. rice paper sushi, external nori paper sushi, internal nori paper sushi and soya paper sushi), however the skilled person will readily understand that the results of the study may be applicable to sushi wrapped with other forms of wrappers, as well as sushi without any wrapper.

Therefore, the only significant difference between the humidified refrigeration unit and the non-humidified refrigeration unit is the ambient humidity level found in each.

Finally, the stored sushi were tested for organoleptic properties after 2, 4, 6, 8, and 10 hours of storage following the time the sushi was freshly prepared. It will be understood that sushi can frequently remain in refrigerated storage for around ten hours following its production.

Study Results:

The results of the study, where the taste of the sushi is qualified by the expert tasters, is summarized in Tables 2 and 3A to 3E.

Table 2 shows the preference expressed by the expert tasters for either the sushi stored in the humidified storage unit or those stored in the non-humidified storage unit at 2, 4, 6, 8 and 10 hours:

TABLE 2

Preference expressed by the expert tasters between
the sushi stored in the humidified refrigeration
unit and the non-humidified refrigeration unit.

| Storage Time (hours) | Preference - sushi stored in the humidified refrigeration unit | Preference - sushi stored in the non-humidified refrigeration unit |
|---|---|---|
| 2 | 56% | 44% |
| 4 | 70% | 30% |
| 6 | 73% | 27% |
| 8 | 91% | 9% |
| 10 | 90% | 10% |

Tables 3A to 3E show the degree of preference expressed by the expert tasters for the sushi stored in the humidified refrigeration unit for each of the types of sushi wrapped with three distinct wrappers, namely external nori paper sushi, internal nori paper sushi and soya paper sushi. Sushi samples were tested after 2, 4, 6, 8 and 10 hours. The expert tasters were asked to assess the degree of difference between the humidified and non-humidified sushi, namely "no difference", "little difference", "moderate difference", "significant difference" and "extreme difference":

TABLE 3A

Degree of difference in taste detected by the expert tasters
between different varieties of sushi when stored in the
humidified refrigerated storage unit versus the non-humidified
refrigerated storage unit after two hours of storage.

| | External Nori Paper Sushi | Internal Nori Paper Sushi | Soya Paper Sushi |
|---|---|---|---|
| Extreme Difference | 0% | 0% | 0% |
| Significant Difference | 0% | 25% | 25% |
| Moderate Difference | 0% | 25% | 25% |
| Little Difference | 50% | 0% | 25% |
| No Difference | 50% | 50% | 25% |

TABLE 3B

Degree of difference in taste detected by the expert tasters
between different varieties of sushi when stored in the humidified
refrigerated storage unit versus the non-humidified refrigerated
storage unit after four hours of storage.

| | External Nori Paper Sushi | Internal Nori Paper Sushi | Soya Paper Sushi |
|---|---|---|---|
| Extreme Difference | 25% | 0% | 0% |
| Significant Difference | 0% | 0% | 0% |
| Moderate Difference | 25% | 0% | 25% |
| Little Difference | 50% | 50% | 75% |
| No Difference | 0% | 50% | 0% |

TABLE 3C

Degree of difference in taste detected by the expert tasters
between different varieties of sushi when stored in the
humidified refrigerated storage unit versus the non-humidified
refrigerated storage unit after six hours of storage.

| | External Nori Paper Sushi | Internal Nori Paper Sushi | Soya Paper Sushi |
|---|---|---|---|
| Extreme Difference | 0% | 0% | 25% |
| Significant Difference | 25% | 0% | 50% |
| Moderate Difference | 25% | 25% | 0% |
| Little Difference | 25% | 75% | 25% |
| No Difference | 25% | 0% | 0% |

TABLE 3D

Degree of difference in taste detected by the expert tasters between different varieties of sushi when stored in the humidified refrigerated storage unit versus the non-humidified refrigerated storage unit after eight hours of storage.

|  | External Nori Paper Sushi | Internal Nori Paper Sushi | Soya Paper Sushi |
| --- | --- | --- | --- |
| Extreme Difference | 25% | 0% | 0% |
| Significant Difference | 50% | 25% | 50% |
| Moderate Difference | 0% | 25% | 0% |
| Little Difference | 25% | 25% | 50% |
| No Difference | 0% | 0% | 0% |

TABLE 3E

Degree of difference in taste detected by the expert tasters between different varieties of sushi when stored in the humidified refrigerated storage unit versus the non-humidified refrigerated storage unit after ten hours of storage.

|  | External Nori Paper Sushi | Internal Nori Paper Sushi | Soya Paper Sushi |
| --- | --- | --- | --- |
| Extreme Difference | 0% | 25% | 0% |
| Significant Difference | 50% | 50% | 25% |
| Moderate Difference | 0% | 0% | 0% |
| Little Difference | 25% | 25% | 25% |
| No Difference | 25% | 0% | 50% |

As shown in the Table 2, only a small difference was detected between the humidified and non-humidified sushi after 2 hours (56% vs. 44%). This may be attributable to the fact that the rice of the sushi, once the sushi is freshly prepared, has a higher water content (around 95%) resulting from it being recently cooked. Therefore, after two hours of storage, both sushi stored in a humidified environment and sushi stored in a non-humidified environment experience a similar drop in humidity following the cooking of the sushi rice and/or the preparation of the sushi. This is also apparent in FIG. 1, show the drop of weight attributable to water loss observed between hour 2 and hour 3 for most of the ambient humidity levels analyzed.

However, starting at 4 hours, and clearly apparent after 8 hours (Tables 2 and 3D), the expert tasters expressed a preference for the sushi that was placed in the humidified refrigeration unit. Therefore, sushi that is subject to a humidified refrigerated environment over a period of at least two hours shows a slight difference in the organoleptic qualities of the sushi when compared to those stored in a refrigeration unit that is not humidified. Over 4 hours, the organoleptic properties of the humidified sushi are better than those of the sushi kept in conventional non-humidified refrigeration units. Over eight hours, the sushi stored in the humidified refrigerated storage unit is clearly better than that of the sushi stored in the conventional non-humidified refrigeration units.

Reference is now made to Table 4, which summarizes the observations made by the expert tasters regarding the difference in organoleptic properties between the sushi in the humidified environment and the sushi in the non-humidified environment, these observations taken at 2, 4, 6, 8 and 10 hours:

TABLE 4 summary of the observations perceived by the expert tasters after 2, 4, 6, 8 and 10 hours of storage between the sushi stored in the humidified environment versus the sushi stored in the non-humidified environment.

| Time | Observations |
| --- | --- |
| 2 hours | The difference perceived by the expert tasters between the humidified environment and the non-humidified environment varied according to the type of sushi tested (external nori paper sushi, internal nori paper sushi and soya paper sushi). This seemed due to the fact that 2 hours of exposition in the refrigeration units, sufficient to perceive a slight difference, is not enough to perceive an important difference. |
| 4 hours | The difference perceived by the expert tasters between the humidified environment and the non-humidified environment is present. So after 4 hours of nebulization, there is a difference observed between the sushi of the two refrigeration units and for each variety of sushi. This difference ranges from 50% to 75%. |
| 6 hours | The difference between the two refrigeration units range from "little" to "sensitive" for internal nori paper sushi and soya paper. The degree of difference varies for the external nori sushi. |
| 8 hours | After 8 hours of exposition in both refrigeration units, the expert tasters experienced an important difference between the 2 types of refrigeration units for each sushi variety, clearly favoring the sushi stored in the humidified environment versus those stored in the non-humidified environment. |
| 10 hours | After 10 hours, the expert tasters also clearly favored the sushi from the humidified environment. The degree of difference is also important for most of the varieties of sushi. |

As a result, because the humidified refrigeration storage unit results in the sushi rice preserving its water content, not losing a significant portion of its water content to the ambient air as it stored during a given period, these sushi stored in a humidified refrigeration storage unit show a markedly improved preservation of overall organoleptic qualities (e.g. texture, taste) when compared to the sushi stored in a conventional refrigeration unit. Therefore, storing sushi in a humidified refrigerated environment results in a significant improvement upon preserving the overall organoleptic qualities of the sushi as a result of the rice not losing water content to the ambient air. The retention of the water content of the sushi rice was studied in Study 2, as explained below.

Study 1': Taste Test at 95% Ambient Humidity:

Similarly, a taste test was conducted using four expert tasters, where the parameters of the humidified and non-humidified refrigeration storage units as well as that of the study were the same as those described above in Table 1 (and in Study 1) aside for the ambient humidity level of the humidified refrigeration unit that was set at 95%.

The expert tasters were asked to indicate their preference between sushi samples. Once again, the expert tasters conducted a blind taste test and were not aware of the differences between the sushi, namely that one was stored at a higher ambient humidity level than the other.

The results showed that the expert tasters expressed, after 6 hours of storage of the sushi, a 75% preference for the sushi stored in the humidified refrigerated storage unit, and a 25% preference for the sushi kept in non-humidified storage. The expert tasters found that the sushi stored in the humidified environment were softer and fresher than those stored in the non-humidified environment (described as being dry and hard).

Therefore, this study shows that storing sushi at 95% humidity ambient level yields a similar improvement to organoleptic properties of the sushi over time when compared to sushi stored in conventional refrigeration units. The sushi is not overly damp at 95% ambient humidity level, and does not lose its texture and/or become mushy.

Study 1": Taste Test at 99% Ambient Humidity:

Similarly, a taste test was conducted using four expert tasters, where the parameters of the humidified and non-humidified refrigeration storage units as well as that of the study were the same as those described above in Table 1 (and in Study 1) aside for the ambient humidity level of the humidified refrigeration unit that was set at 99%.

The expert tasters were asked to indicate their preference between sushi samples. Once again, the expert tasters conducted a blind taste test and were not aware of the differences between the sushi, namely that one was stored at a higher ambient humidity level than the other.

However, after 6 hours of storage, the expert tasters showed only a 42% preference for the sushi stored in the humidified environment, where 33% preferred the sushi stored in the non-humidified environment, and 25% did not show any preference for either one or the other. The expert tasters found that the sushi stored in the humidified environment was very humid, unpleasantly soft, wet and very sticky. On the other hand, the expert tasters found that the sushi stored in the conventional refrigeration unit was dry, hard and acidic. As a result, storing sushi where the ambient humidity level is 99% or higher is undesirable, as the sushi rice absorbs too much water, loosing its consistency, resulting in rice that is too mushy and sticky. Preferably, the ambient humidity level for storage is maintained under 99% for storage during prolonged periods (such as six hours or more).

Study 1''': Taste Test at Above 65% Ambient Humidity:

Similarly, a taste test was conducted between sushi stored in a refrigeration unit with a slight humidification, where an ambient humidity level is set just above 65% (that of conventional refrigerators). Here again, with only minimal humidification, after four hours of storage, the four tasters indicated that they preferred the sushi stored in the humidified unit, expressing an improvement in texture, taste and visual appeal over the sushi stored in the non-humidified environment.

Therefore, an improvement in organoleptic properties is apparent when compared to sushi stored in a mildly humidified environment (over 65%; about 68%) and sushi stored in a non-humidified environment.

Study 2: Ambient Humidity and Moisture Retention of the Sushi Rice:

Study Overview:

The weight loss of sushi was measured over time in refrigeration units set at different ambient humidity levels. The purpose of the study was to quantify the water lost to the ambient air when the sushi was stored. This loss of water is quantifiable by the weight loss experienced by the sushi as a function of time.

Study Parameters:

Refrigeration units were set at given humidity levels (60%, 65%, 70%, 75%, 80%, 82.5%, 85% and 95%). The humidity level of a conventional refrigerator is around 60%-65%. The storage units were set at temperatures ranging from 0° C. to 3° C.

Balls of sushi rice were prepared and weighed before being placed in the refrigeration unit set at a given humidity level. The sushi rice was then weighed after every hour for a total of eight hours.

Study Results:

Reference is now made to FIG. 1, illustrating the percentage drop of the weight of the sushi rice as a function of time. The percentage drop in weight from that of the previous hour was measured after each hour. This calculation was performed at the different humidity levels and plotted, the plots illustrated in FIG. 1. The percent weight different is calculated as follows: (weight of the previous hour−weight of the current hour) divided by (weight of the previous hour)*100. The calculated p value for the graph is p=0.001.

As shown in FIG. 1, there is a significant drop in weight for the sushi rice for all ambient humidity levels after around 1 hour. However, after 2 hours, at an ambient humidity level starting at around 80%, the weight loss becomes less important, showing that already at an ambient humidity level of around 80%, the sushi rice is losing less humidity as a function of time.

Even with slight humidification, where the ambient humidity level is raised only slightly above 65% (e.g. averaging around 68%), it is shown that the reduction in the loss of water of the rice is quantifiable when compared with sushi rice stored in conventional refrigeration units when stored for significant periods of time (e.g. over 6 hours).

However, once the sushi rice is placed in an environment where the humidity level is set at around 82.5%, the weight loss resulting from a loss of water is minimal, ranging around 0.2% per hour, starting at after two hours. A loss of water of the sushi rice under 0.5% per hour (except for the first hour) may be considered as significant water retention of the sushi rice. This minimal weight is also apparent for humidity levels above 82.5%, such as 85% and 95%.

The results showcased in FIG. 1, demonstrating how a higher humidity level results in the rice losing less water, can also be correlated with the results from Study 1, where the sushi found in the humidified environment was preferred over that in the conventional refrigerator. In fact, as shown in FIG. 1, the sushi rice kept in the convention refrigerator (at a humidity level of around 60%-65%), continued to lose significant quantities of water as a function of time, consistently above 0.5% and even 1%. As a result, conserving the water content of the rice is correlated with preserving the organoleptic properties of the sushi.

An ambient humidity level above 65% and below 99%, and preferably from of about 80% to about 95%, is beneficial for sushi storage, where the water content of the sushi rice is significantly preserved, while avoiding the sushi rice reaching a state where it is too mushy or watery (that is experienced at humidity levels at or above 99%). Therefore, placing the sushi in a refrigeration unit with an ambient humidity level over 65% and under 99% results in a preservation of the organoleptic properties of the sushi over time during storage, as at these humidity levels, there is a measured decrease in the water loss of the sushi rice when compared with the conventional refrigeration units (having an ambient humidity level set at around 60%-65%). In some embodiments, it is advantageous to place the sushi in an environment with an ambient humidity level between around 82.5% and under 99% (e.g. 95%) due to the significant degree in water loss of the rice sushi experienced at these ambient humidity levels.

Applications to Sushi Storage and Preservation:

Storage of sushi after preparation can be improved by placing the sushi in a refrigeration storage unit having an ambient humidity level that is greater than that of non-humidified refrigerated storage units (i.e. over 65%) and under 99% humidity. For instance, the ambient humidity level may be between about 80% and under 99%. In some embodiments, the ambient humidity level may be between around 82.5% and around 95% humidity (or under 99% humidity). In some examples, the ambient humidity level is set at around 85% humidity.

Typical storage times may range from anywhere from one hour, two hours to over ten hours (in some cases, even under 24 hours—where at 24 hours, in both humidified and non-humidified refrigerators, it is preferable to not consume the sushi). Preferably, the sushi may be kept up to less than fifteen hours (or up to around 12 hours). The temperature of storage can be, for instance, anywhere between 1 degree Celsius and 7 degrees Celsius.

The ambient humidity level can be optimally set for specific sushi to preserve the moisture in the sushi rice. In some examples, it may be advantageous to assess the correct ambient humidity level to prevent the sushi rice from losing water. Different rice types, including between different rice batches, may have different properties that may impact upon moisture retention and the ambient humidity level that will lead to improved water retention of the sushi rice. As a result, in some examples, it is advantageous to measure and/or adjust the ambient humidity level for storage.

In some embodiments, a sample of sushi rice may be used to determine the appropriate ambient humidity level for storage. For instance, the initial weight of the sushi rice sample may be determined prior to storage in the refrigeration unit. The sushi rice sample may then be placed in the humidified refrigeration storage unit at a given ambient humidity level. After a given period following the placing of the rice in the refrigeration unit, a second weight measurement may be taken. However, a third way measurement may also be taken at a third time. If the weight of the rice sample changes, e.g. drops, then the ambient humidity level of the humidified refrigeration unit may be adjusted (e.g. increased). The weight of the sushi rice sample may then be measured again at a fourth time, and the steps repeated until the drop in the weight of the sushi rice is negligible (e.g. 0.2%), indicating an appropriate ambient humidity level for storage. Preferably, a new rice sushi sample is used each time the ambient humidity level is adjusted. However, when conducting the following method to assess the required ambient humidity level, it is important to consider the initial loss of weight (and water) that may occur up to about the first hour, as illustrated in FIG. 1. Therefore, it may be preferable to place the sushi sample in the humidified refrigerated storage unit and take weight measurements after, for example, 1 hour and compare with the weight measurement after, for example, 2 hours. A skilled person will readily understand that weight measurements taken at any time appropriate to assess the ambient humidity level of the storage unit may be used without departing from the teachings presented herein.

Preferably, the sushi rice sample used is of the same rice type as the sushi that is to be preserved in the humidified refrigerated storage unit.

Moreover, in some embodiments, other means of measuring the water content of the sushi rice, such as a humidity detector, other than by measuring the weight, may be used to measure the water content of the sushi rice and to adjust the ambient humidity level accordingly.

In some embodiments, instead of using a sushi rice sample to assess the ambient humidity level, it is possible to weigh the sushi that is placed in the humidified refrigerated storage unit as a function of time. The ambient humidity level can therefore be adjusted if a significant drop in the weight of the sushi is noted when comparing the weights at two different times since the beginning of storage (also considering the initial drop of sushi weight up to around one hour, as shown in FIG. 1). This continuous weighing of the sushi allows for adjusting and improving upon the ambient humidity level to optimize the conservation of moisture within the sushi rice.

Figure 3:
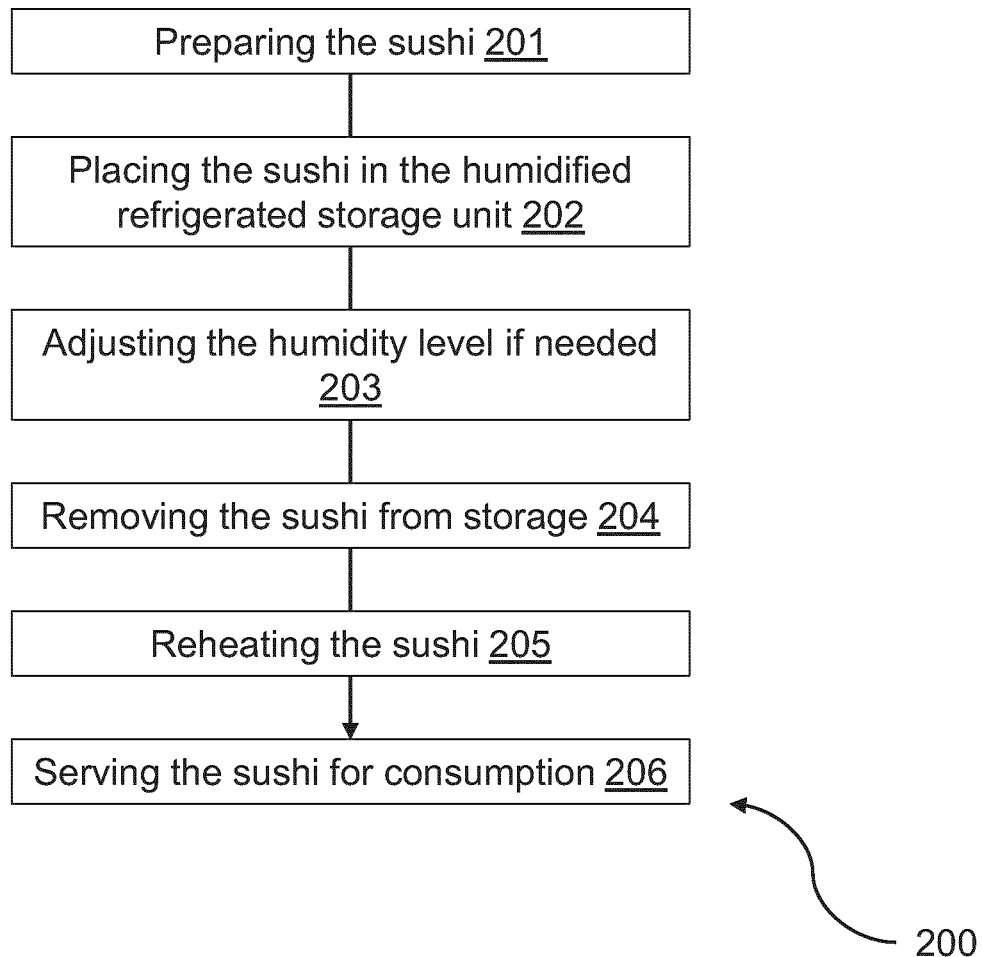
FIG. 3 is a flowchart diagram of an exemplary method for preparing and storing sushi in a humidified refrigerated storage unit for consumption.

Reference is now made to FIG. 3, illustrating an exemplary method 200 for preparing and storing sushi for future consumption, wherein the sushi is stored in a humidified refrigerated environment to preserve its organoleptic properties.

The sushi is first prepared at step 201. The sushi may be prepared at the same location where the sushi is to be served. As described in FIGS. 4A and 4B, the sushi may also be prepared off-site, and, for instance, transported to the site for serving where the end users will consume the sushi.

Once prepared, if the sushi is not to be consumed immediately, the sushi is placed in the humidified refrigerated storage unit at step 202 to preserve the moisture of the sushi rice. The ambient humidity level is superior to 65%, where 60%-65% humidity is typically the ambient humidity level of conventional non-humidified refrigeration units. In some embodiments, the ambient humidity level may be between around 80% and around 95% (or under 99%). In some embodiments, the ambient humidity level is between around 82.5% and around 95%. The sushi may be stored in the humidified refrigerated storage unit for anywhere between one hour to fifteen hours after preparation. Sushi may be preferably consumed at most twenty-four hours after preparation.

The sushi may be stored anywhere between around 1° C. and around 4° C.

The ambient humidity level of the humidified refrigerated storage unit may be adjusted at step 203. The adjustment may be made as a function of weight change of a sushi rice sample, or that of a sushi over time, (or by measuring the humidity or water content over time of the rice) as explained herein. The adjustment of the ambient humidity level may be made to avoid future loss of water in the sushi rice to the ambient air.

The sushi is then removed from storage prior to consumption at step 204.

The sushi is reheated prior to consumption at step 205. As the sushi was refrigerated, its temperature may be at that of the temperature of refrigeration, e.g. around 1° C. and around 7° C. In some embodiments, the sushi may be reheated to above 9° C. prior to consumption. In other embodiments, the sushi may be reheated to at least around 10° C. prior to consumption. The reheating of the sushi may be carried out using a heating device, such as an exemplary heating device 100, as explained herein. In some embodiments, the sushi is not reheated for more than 120 seconds to preserve the integrity of the ingredients (e.g. not cook the ingredients). In some embodiments, the sushi may be reheated for around 90 seconds.

Once reheated, the sushi is then served for consumption at step 206.

Figure 4A:
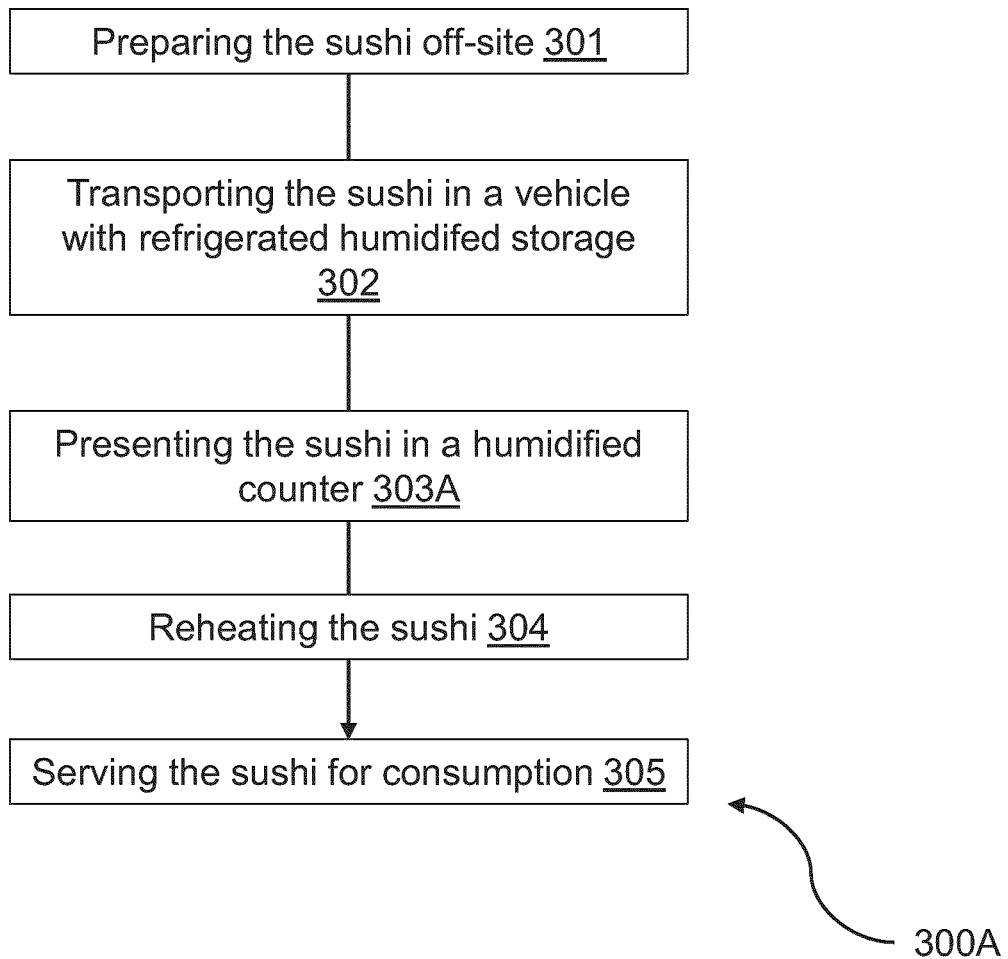
FIG. 4A is a flowchart diagram of another exemplary method for preparing and storing sushi in a humidified refrigerated storage unit for consumption, where the sushi is prepared off-site.
Figure 4B:
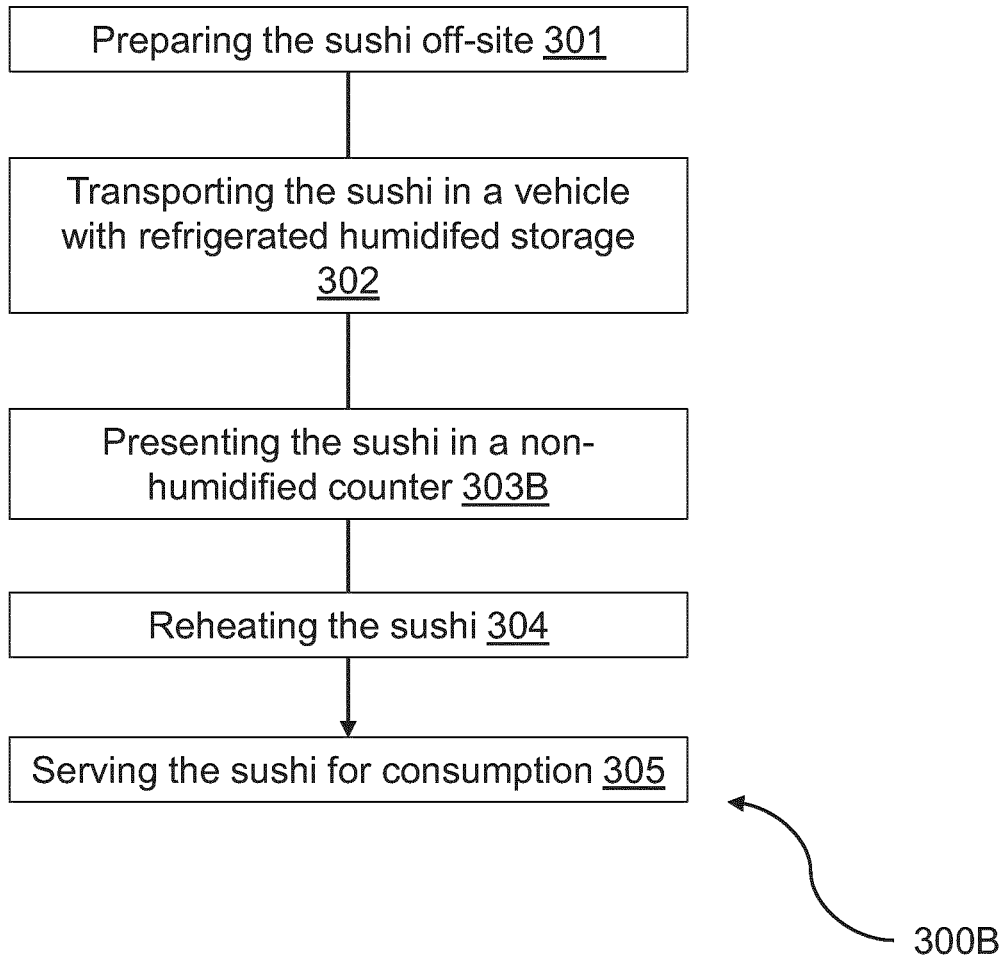
FIG. 4B is a flowchart diagram of another exemplary method for preparing and storing sushi in a humidified refrigerated storage unit for consumption, where the sushi is prepared off-site.

Reference is now made to FIGS. 4A and 4B, illustrating respectively exemplary methods 300A and 300B for preparing and storing sushi for future consumption, wherein the sushi is stored in a humidified refrigerated environment to preserve its organoleptic properties. In the method 300, the sushi is prepared off-site (not at the same location where the sushi is served and consumed) at step 301.

The sushi is then transported to the site where the sushi is to be presented and/or consumed at step 302. The transportation vehicle (e.g. a truck or car) may have a humidified refrigerated storage compartment for storing the sushi during transport. The ambient humidity level is superior to 65%, where 60%-65% humidity is typically the ambient humidity level of conventional non-humidified refrigeration units. In some embodiments, the ambient humidity level may be between around 80% and around 95% (or under 99%). In some embodiments, the ambient humidity level is between around 82.5% and around 95%. The sushi may be stored anywhere between around 1° C. and around 6° C. In other examples, a humidified refrigerated storage unit may be brought onto the vehicle for transport. In some examples, the sushi may be delivered directed to the end consumer, such as at its home, office, etc.

Once the sushi has arrived at the site where it will be presented and/or served (e.g. the restaurant, the fast food counter, the food truck, etc.), the sushi may then be placed in a refrigerated counter that is also humidified at step 303A for further storage to preserve the organoleptic properties of the sushi until it is served for consumption. However, as described in method 300B of FIG. 4B, the sushi may also be stored in a conventional counter or refrigerated counter until consumption at step 303B. When the sushi is to remain at the site, such as the restaurant, for a prolonged period before consumption (e.g. 2 hours), keeping the sushi in a humidified storage counter has the advantage of maintaining a significant portion of the moistness of the rice, which may impact the overall taste and texture of the sushi when consumed.

The sushi is then reheated at step 304 as explained herein prior to it being served. The sushi is then served for consumption at step 305.

Rapid Reheating of Sushi:

The present application also relates to the rapid reheating of refrigerated sushi for serving prior to consumption. Sushi is typically refrigerated for storage at temperatures between around 1° C. to around 7° C. Consuming sushi at these cold temperatures impacts the overall culinary experience, and it is therefore preferable to reheat the sushi prior to consumption. However, reheating of sushi may negatively impact the ingredients if not performed appropriately. For instance, raw ingredients, such as fish, are delicate and can easily cook if overexposed to heat. Therefore, the time and intensity of exposure to heat requires careful monitoring. Moreover, a single heat source may only partially heat the sushi, such as its top or base, leaving a portion of the sushi still cold.

Preferably, the sushi is to be reheated to above 9° C. prior to consumption. In some embodiments, it is preferable to heat the sushi to around 10° C. for consumption. The skilled person will understand that reheating of the sushi to any temperature between around 9° C. to around room temperature (about 20° C.) may be achieved prior to consumption.

Figure 2:
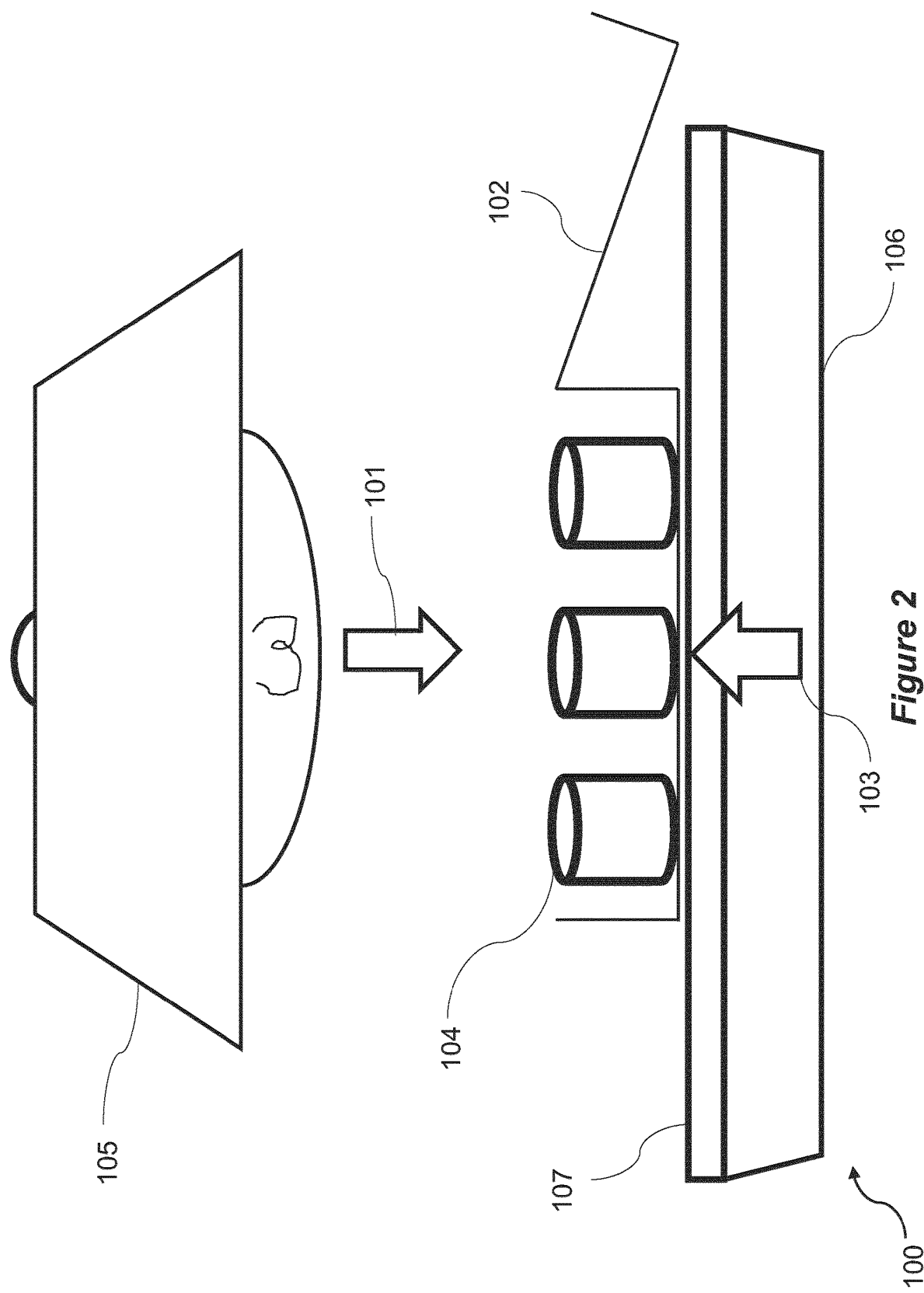
FIG. 2 is front view of a schematic illustration of an exemplary heating device for reheating sushi that has been stored in a refrigerated storage unit.

Reference is made to FIG. 2, illustrating an exemplary heating device 100 for reheating sushi 104 prior to consumption. The heating device 100 has at least two heat sources 105 and 106. A first heat source 106 provides direct heat 103 to the sushi 104, by direct heat (and direct heat transfer) it is meant that the first heat source 106 and/or the heated surface 107 comes into contact (directly or indirectly—indirectly if the first source is separated from the sushi 104 by e.g. a box 102, or the surface 107) with the sushi 104. The first heat source 106 is, in some embodiments, a hot plate 106 as is known in the art, providing heat 103 from below to the portion of the sushi 104 resting on the surface 107. The hot plate 106 acts as a source of direct heat 103 and as a surface 106 on which the sushi may rest. In some examples, the surface 107 is part of the hot plate 106, wherein the surface 107 is an upper surface of the hot plate 106. In other examples, the surface 107 may be separate from the hot plate 106, wherein the hot plate 106 comes into contact with the surface 107, heating the surface 107 which in turn heats the sushi 104 that is positioned thereon. In these examples, the surface 107 may be made out of metal (e.g. a conductive metal). In some embodiments, the heat 103 produced by the hot plate 106 may be regulated. In others, the heat 103 produced by the hot plate 106 is not regulated. It will be understood that any other heat source to provide heat below the sushi combined with a surface on which the sushi may rest may be used. For example, the heat source may a heating lamp and the surface may be a glass counter (heated by the heating lamp). The skilled person will understand that other heat sources may be used to provide direct heat to the sushi.

The second heat source 105 used provides heat 101 from above, and is therefore opposite to the first heat source 106, where there is a space between the first heat source 106 and the second heat source 105 sufficient to fit at least one sushi 104 for reheating within the space. Moreover, the second heat source 105 is not a source of direct heat as it does not come directly or indirectly into contact with the sushi 104 (e.g. separated by air). The second heat source 105 is a source of indirect heat 101 (where heat 101 is transferred indirectly to the sushi 104). In some examples, the second heat source 105 is a heating lamp, as is known in the art, located above the sushi 104. In some embodiments, the heat 101 generated by the heating lamp 105 may be controlled. In other embodiments, the heat 101 generated by the heating lamp 105 may not be controlled.

In some embodiments, there may be a third heat source having a different position from the first 106 and second heat source 105, where the third heat source provides heat substantially to another portion of the sushi 104, such as its side (e.g. where the third heat source is angled or perpendicular to the first 106 and/or second heat source 105). In some embodiments, like with the second heat source 105, the third heat source 106 does not provide direct heat. The skilled person will understand that additional heat sources, at different positions and angles, may be used to optimize and/or improve the reheating of the sushi 104 by focusing the heat and resulting in the reduction of the time of exposure of the sushi to the heat source. Therefore, the combination of at least two heat sources to reheat the sushi 104, one providing direct heat where the second provides indirect heat, leads to the advantage of reheating the sushi sufficiently for consumption, while not affecting the properties of the ingredients (e.g. cooking the ingredients).

In some examples, the sushi 104 may be placed in a box 102 (e.g. such as a takeout box), where the box 102 is placed onto the surface 107. In some examples, the box 102 may be made out of cardboard. For the purposes of this application, the first heating source 106 (and/or the surface 107) is still considered to provide direct heat 103 to the sushi 104, even if the box 102 separates the sushi 104 from the first heat source 106 and/or the surface 107.

In order to not alter the organoleptic properties of the sushi during reheating (e.g. by cooking at least certain of the ingredients composing the sushi), it is preferable for the sushi to not be exposed to the heat sources for more than two minutes (120 seconds) for reheating. Therefore, the heat sources are of sufficient strength to increase the internal temperature of the sushi from its refrigerated temperature (between around 1° C. to around 6° C.) to above around 9° C. during this time. In some embodiments, the sushi is preferably reheated in or under 90 seconds of exposure to the heat source. In some embodiments, optimal reheating is 91 seconds.

The dual heat source, heating the sushi from above and below, allows for the heat to evenly distribute throughout the sushi prior to consumption, reaching the desired internal temperature of above 9° C., and this in reduced time. In some embodiments, the sushi is reheated to an internal temperature of around 10° C. prior to serving.

In some embodiments, the heat generated by either or both of the first and second heat source is monitored over time in order to ensure that the heat source is not of sufficient strength to cook the ingredients of the sushi (e.g. the fish or seafood).

In some embodiments, the internal temperature of the reheated sushi may be monitored to insured that the sushi is not overheated.

In some embodiments, a refrigerated sushi sample may be used to determine the time taken to reach the adequate internal temperature of the sushi. The internal temperature of the sushi may be evaluated by using, for instance, a thermometer placed within the sushi.

The description of the present invention has been presented for purposes of illustration but is not intended to be exhaustive or limited to the disclosed embodiments. Many modifications and variations will be apparent to those of ordinary skill in the art.

What is claimed is:

1. A method of providing sushi for consumption comprising:
    preparing fresh sushi, said fresh sushi comprising a quantity of freshly cooked rice combined with at least one other fresh ingredient;
    placing said fresh sushi, wherein said fresh sushi is not frozen, in a humidified refrigerated storage unit, wherein an ambient humidity level of said humidified refrigerated storage unit is controlled to be over 65% and below 99% through water nebulization and at a temperature between 1° C. and 7° C.;
    preserving for a period of at least two hours and under twenty-four hours said sushi in said humidified refrigerated storage unit, wherein said maintaining ambient humidity level reduces loss of moisture of the sushi rice of said sushi during said preservation period in comparison with non-humidified refrigerated storage; and
    removing said sushi from said humidified refrigerated storage unit prior to being served.

2. The method of claim 1, further comprising, after said removal from said humidified refrigerated storage unit, and prior to being served, preheating said sushi until said rice of said sushi reaches a temperature of around at least 9° C.

3. The method of claim 2, wherein said preheating is maintained until said sushi rice of said sushi reaches a temperature of above 10° C.

4. The method as defined in claim 1, wherein said ambient humidity level is above about 70% and below about 95%.

5. The method as defined in claim 1, wherein said ambient humidity level is between about 82% and 90%.

6. The method as defined in claim 1, wherein said ambient humidity level is about 85%.

7. The method as defined in claim 1, wherein said fresh sushi is preserved in said humidified refrigerated storage unit for a period under twelve hours.

8. The method as defined in claim 1, wherein said fresh sushi is preserved in said humidified refrigerated storage unit for a period of at least four hours.

9. The method as defined in claim 1, wherein said fresh sushi is preserved in said humidified refrigerated storage unit for a period of at least eight hours.

10. The method as defined in claim 1, wherein said method further comprises:
    measuring an initial weight of said sushi corresponding to a weight of said sushi when said sushi is placed in said humidified refrigerated storage unit;
    measuring a periodic weight of said sushi taken at a designated period following the time said sushi has been placed in said humidified refrigerated storage unit; and
    comparing said initial weight to said periodic weight to monitor the adequacy of said ambient humidity level.

11. The method as defined in claim 1, further comprising, prior to said placing of said sushi in said humidified refrigerated storage unit:
    placing a rice sample with a known initial weight in said humidified refrigerated storage unit;
    measuring a subsequent weight of said after a designated time interval from the time of said placing of said in said humidified refrigerated storage unit to detect any difference of weight between said initial weight of said and said subsequent weight of said, wherein said difference of weight is attributable to a change in the water content of said; and
    adjusting said ambient humidity level as a function of said detected weight difference of said.

12. The method as defined in claim 11, wherein said placed in said humidified refrigerated storage unit is of a same type as the rice used in fresh sushi.

* * * * *

UNITED STATES PATENT AND TRADEMARK OFFICE
CERTIFICATE OF CORRECTION

| | | |
|---|---|---|
| PATENT NO. | : 11,185,097 B2 | Page 1 of 1 |
| APPLICATION NO. | : 16/614087 | |
| DATED | : November 30, 2021 | |
| INVENTOR(S) | : Serge Mboumtcho et al. | |

It is certified that error appears in the above-identified patent and that said Letters Patent is hereby corrected as shown below:

On the Title Page
On the Page 2, Column 2, item (56), under 'OTHER PUBLICATIONS', Line 12, delete "Compressoer" and insert -- Compressor --, therefor.
On the Page 2, Column 2, item (56), under 'OTHER PUBLICATIONS', Line 14, delete "retrived" and insert -- retrieved --, therefor.

In the Specification
In Column 1, Line 15, delete "involves" and insert -- involve --, therefor.
In Column 4, Line 41, after "FIG. 2 is" insert -- a --.
In Column 5, Line 11, delete "heat-source" and insert -- heat source --, therefor.
In Column 6, Line 20, after "it is" delete "a".
In Column 7, Line 45, delete "is" insert -- "are" --.
In Column 9, Line 33, after "in" delete ""the"".
In Column 10, Line 36, after "it" insert -- is --.
In Column 12, Line 27, after "starting" delete "at".
In Column 12, Line 44, after "from" delete "of".
In Column 15, Line 11, delete "directed" and insert -- "directly" --, therefor.
In Column 16, Line 11, after "may" insert -- be --.

In the Claims
In Column 18, Claim 11, Line 35, after "said" insert -- rice sample --.
In Column 18, Claim 11, Line 36, after "placing of said" insert -- rice sample --.
In Column 18, Claim 11, Line 38, after "weight of said" insert -- rice sample --.
In Column 18, Claim 11, Line 39, after "of said" insert -- rice sample --.
In Column 18, Claim 11, Line 41, after "of said" insert -- rice sample --.
In Column 18, Claim 11, Line 43, after "of said" insert -- rice sample --.
In Column 18, Claim 12, Line 44, after "wherein said" insert -- rice sample --.

Signed and Sealed this
Twenty-sixth Day of December, 2023

Katherine Kelly Vidal
*Director of the United States Patent and Trademark Office*